(12) United States Patent
Orlando et al.

(10) Patent No.: US 11,915,589 B2
(45) Date of Patent: Feb. 27, 2024

(54) ANTI-COLLISION SYSTEM AND METHOD FOR GROUND VEHICLES

(71) Applicant: UBIQUICOM S.R.L., Milan (IT)

(72) Inventors: Michele Orlando, Milan (IT); Andrea Capolei, Cosenza (IT); Claudio Rosace, Cosenza (IT); Stefano Sarasso, Milan (IT)

(73) Assignee: UBIQUICOM S.R.L, Milan (IT)

( * ) Notice: Subject to any disclaimer, the term of this patent is extended or adjusted under 35 U.S.C. 154(b) by 0 days.

(21) Appl. No.: 17/626,827

(22) PCT Filed: Jul. 17, 2020

(86) PCT No.: PCT/IB2020/056730
§ 371 (c)(1),
(2) Date: Jan. 13, 2022

(87) PCT Pub. No.: WO2021/014303
PCT Pub. Date: Jan. 28, 2021

(65) Prior Publication Data
US 2022/0292973 A1    Sep. 15, 2022

(30) Foreign Application Priority Data
Jul. 19, 2019   (IT) .......................... 102019000012414

(51) Int. Cl.
*G08G 1/16* (2006.01)
*B66F 9/075* (2006.01)
(Continued)

(52) U.S. Cl.
CPC .............. *G08G 1/16* (2013.01); *B60Q 9/008* (2013.01); *B66F 9/0755* (2013.01); *B66F 17/003* (2013.01)

(58) Field of Classification Search
None
See application file for complete search history.

(56) References Cited

U.S. PATENT DOCUMENTS

| 8,115,650 B2 * | 2/2012 | Dasilva | F16P 3/141 340/572.1 |
| 11,594,042 B1 * | 2/2023 | Sarti | B60W 30/0956 |

(Continued)

FOREIGN PATENT DOCUMENTS

| CN | 104802707 A | 7/2015 |
| CN | 105303346 A | 2/2016 |
| EP | 2945037 B1 | 11/2015 |

OTHER PUBLICATIONS

International Search Report and Written Opinion received for International PCT Application No. PCT/IB2020/056730, dated Jan. 28, 2021, 10 Pages.

*Primary Examiner* — Muhammad Adnan
(74) *Attorney, Agent, or Firm* — Gearhart Law LLC; David Postolski (57) ABSTRACT

The present invention describes an anti-collision system (1) for ground vehicles, comprising a first transceiver device (4), associated with an obstacle (B), configured to generate and transmit one or more wireless signals (SG_B_i), at pre-established time intervals, the first wireless signal (SG_B_1) carrying an obstacle identification code (ID_1); a second transceiver device (3), associated with a ground vehicle (A), configured to transmit one or more wireless signals (SG_A_i) and to receive said one or more wireless signals (SG_B_i) comprising said first wireless signal (SG_B_1) carrying the obstacle identification code (ID_1); a processing unit (20) configured to process collision data of said vehicle (A) comprising: a first calculation module (21) configured to determine the trajectory (D_TRJ) of the ground vehicle (A) and the obstacle (B) as a function of said wireless signals (SG_B_i) and said wireless signals (SG_A_i); a second calculation module (23) configured to determine on the basis of said trajectory (D_TRJ) the probability of collision between the ground vehicle (A) and (Continued)

the obstacle (B); an alerting module (24) configured to generate and send a signal of probability of collision (S_COLL) between the ground vehicle (A) and the obstacle (B) as a function of a high probability of collision between said ground vehicle (A) and the obstacle (B). The invention further describes a corresponding method and computer program.

23 Claims, 5 Drawing Sheets

(51) Int. Cl.
    *B60Q 9/00* (2006.01)
    *B66F 17/00* (2006.01)

(56) References Cited

U.S. PATENT DOCUMENTS

| | | | |
|---|---|---|---|
| 2011/0199199 A1* | 8/2011 | Perkins | B60Q 9/008 340/435 |
| 2013/0321209 A1* | 12/2013 | Kalliola | G01S 13/825 342/419 |
| 2015/0035685 A1* | 2/2015 | Strickland | B60Q 1/525 340/901 |
| 2015/0091740 A1* | 4/2015 | Bai | B60K 35/00 340/901 |
| 2015/0251599 A1* | 9/2015 | Koravadi | G01S 19/42 340/903 |
| 2016/0318445 A1* | 11/2016 | Sugimoto | G06F 3/00 |
| 2017/0353777 A1* | 12/2017 | Mach | G08B 21/12 |
| 2018/0236985 A1* | 8/2018 | Kim | G06F 16/2365 |
| 2019/0182415 A1* | 6/2019 | Sivan | G06F 3/013 |
| 2020/0175875 A1* | 6/2020 | Swan | G01S 13/91 |
| 2020/0372789 A1* | 11/2020 | Norris | G08C 17/02 |
| 2021/0268998 A1* | 9/2021 | Brickwedde | B60W 30/0953 |
| 2021/0284141 A1* | 9/2021 | Sugaya | G08G 1/166 |
| 2022/0101732 A1* | 3/2022 | Saur | G08G 1/166 |
| 2022/0135027 A1* | 5/2022 | Bravi | G06T 7/246 701/119 |

\* cited by examiner

ANTI-COLLISION SYSTEM AND METHOD FOR GROUND VEHICLES

This application is a National Stage application of PCT-application number PCT/IB2020/056730 filed Jul. 17, 2020, which claims priority to Italian patent application No. 102019000012414 filed Jul. 19, 2019, both disclosures are incorporated herein by reference.

TECHNICAL FIELD

The present invention relates to an anti-collision system and a method for ground vehicles.

In particular, the present invention relates to a system and a method for predicting and preventing collisions for forklifts operating both indoors and outdoors.

PRIOR ART

The reduction and prevention of accidents involving ground vehicles, in particular at the workplace, are of primary importance in any industrial sector, especially where workers are in direct contact with moving vehicles (both traditional and self-driving), potential obstacles, machinery, both fixed and self-propelled, presenting potential risks to humans.

Many serious or very serious damages, up to death, occur in the event of the collision of people in the workplace by self-propelled machines and vehicles.

Risks of collision between self-propelled vehicles and operators occur for example in construction sites, where earthmoving or transport machines in general operate, in port areas, warehouses, storage areas and the like. Similar problems also occur in manufacturing plants in general, for example foundries, paper mills and the like.

So-called active systems for the prevention of accidents at work have been developed.

In the specific case of the prevention of collisions between man and vehicle or between vehicle and vehicle or between vehicle and fixed obstacle, active systems employing sensors mounted on vehicles have been adopted, which sensors are for example configured as readers of so-called RFID tags or transponders.

The operator wears at least one RFID tag, for example mounted on a helmet, jacket, or other mandatory passive safety device. The operator operating the self-propelled vehicle is alerted by a central unit when a sensor mounted on the vehicle detects the presence of a person within the vehicle's range, thanks to the interaction between the sensor and the RFID tag. In addition, when the presence of a person within the vehicle's range is detected, other safety measures may be activated such as, for example, slowing down the vehicle. Similarly, a fixed or moving obstacle may be provided with RFID tags. The use of RFID transponder technology for the active prevention of accidents at work is therefore well known. This known technology provides a system comprising at least one sensor and one or more transponders or RFID tags, which are capable of communicating with each other. Both the sensor or the reader and the transponder, or response device, each comprise two separate antennas.

A first antenna on the sensor and a first antenna on the transponder serve respectively to emit and receive a signal, typically microwave, which has the function of "awakening" or activating the RFID transponder, which is normally in a state of quiescence also to save energy.

The transponder is activated when it enters a restricted range or control volume of the sensor.

A second antenna on the transponder or response device and a corresponding second antenna on the sensor allow transmission from the transponder to the sensor and/or vice versa on a channel, typically in radio frequency, different from the channel on which the transponder activation signal is emitted.

Applications of this technology are known in the active prevention of accidents at work, in particular to prevent collisions between ground operators and vehicles. At least one sensor, usually more than one sensor, is installed on the vehicle, while the operator is wearing at least one transponder. When the operator enters the range of one of the sensors on board the vehicle, said sensor causes the transponder to awaken and emit an alarm.

The systems described above have proved to be useful tools in the prevention of accidents at work.

In the known systems, one perceived problem is that of possible signal interference, especially in closed environments such as warehouses, factories or other work environments. In fact, many current navigation systems lose signal when an object or mode of interference is present. This is a problem especially in buildings, which are often crowded with various types of objects.

There is, however, still room to further increase the attainable level of safety.

One of the objects of some embodiments of the invention described herein is to improve the level of safety as well as the ergonomics of this type of active protection system.

A further object of the present invention is to increase accuracy by eliminating false positives through localisation.

Another object of the present invention is that of providing an anti-collision system and a method for ground vehicles operating in a work environment which can guarantee a high level of safety.

A further object of the present invention is that of providing an anti-collision system and a method for ground vehicles operating in a work environment which is efficient.

A further and not least object of the present invention is that of providing an anti-collision system and a method for ground vehicles operating in a work environment which is highly reliable, easy to realise and simple to use.

OBJECT OF THE INVENTION

In a first aspect of the invention, the above-mentioned objects are achieved by an anti-collision system for ground vehicles operating in a work environment according to that which is disclosed in claim 1.

Advantageous aspects are disclosed in dependent claims 2 to 13.

In a second aspect of the invention, the above-mentioned objects are achieved by an anti-collision method for ground vehicles operating in a work environment according to that which is disclosed in claim 14.

In a third aspect, the invention describes a computer program, which, when running on a computer, implements at least one or more steps of the method according to the second aspect of the invention, according to that which is disclosed in claim 15.

In general, the invention offers the following technical effects:

allows an increase in the safety of operators and ground vehicles operating inside closed areas.

The technical effects/advantages mentioned, and other technical effects/advantages of the invention, will emerge in further detail from the description provided herein below of an example embodiment provided by way of approximate and non-limiting example with reference to the appended drawings.

BRIEF DESCRIPTION OF THE DRAWINGS

For a better understanding of the invention and to appreciate the advantages thereof, some non-limiting example embodiments are described herein below, referring to the attached figures, in which.

DETAILED DESCRIPTION OF PREFERRED EMBODIMENTS OF THE INVENTION

It should be observed that in the following description, identical or analogous blocks, components or modules are indicated in the figures with the same numerical references, even where they are illustrated in different embodiments of the invention.

Figure 1:
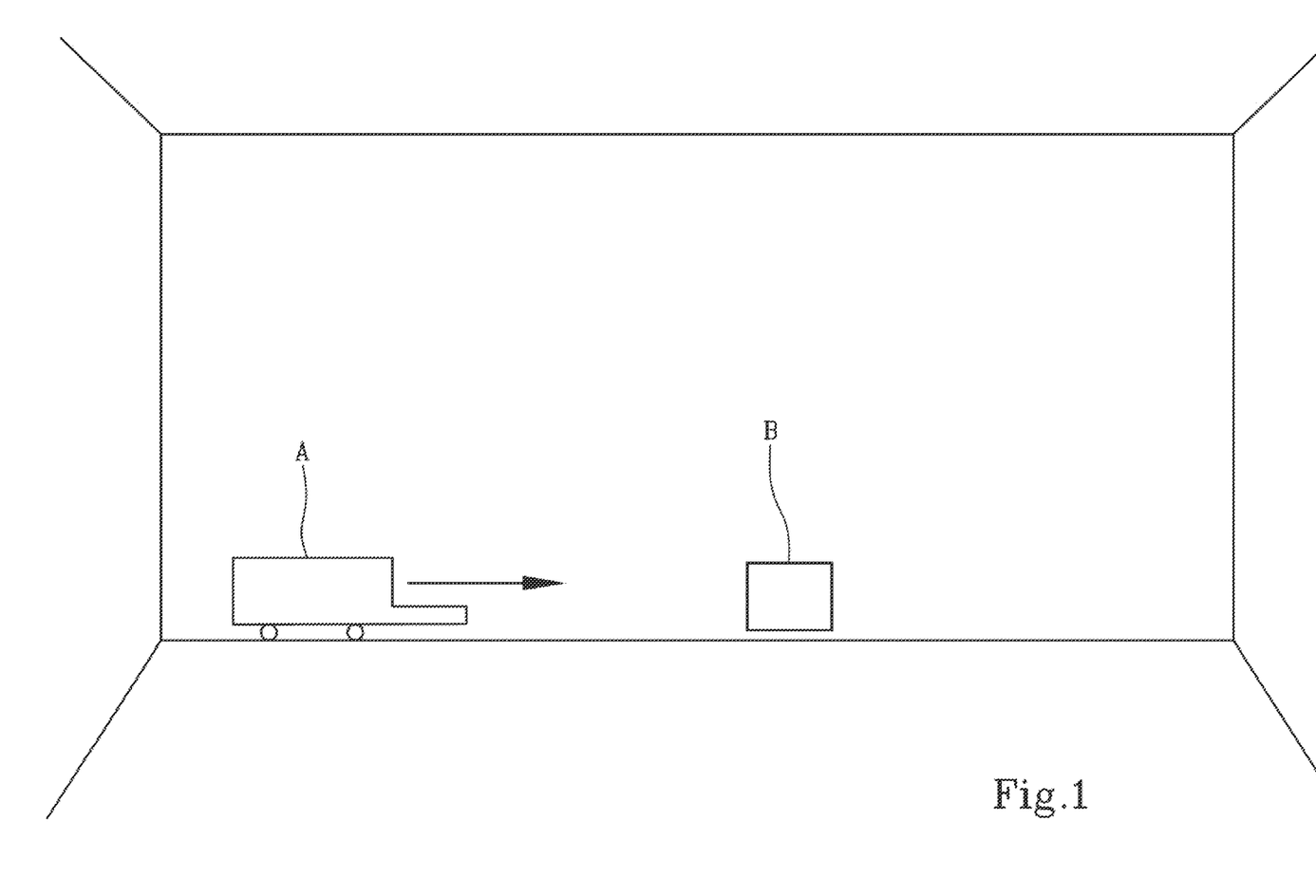
FIG. 1 illustrates an example of the system of the invention adapted to reduce the probability of collisions between possible obstacles and ground vehicles operating within a workplace.
Figure 2:
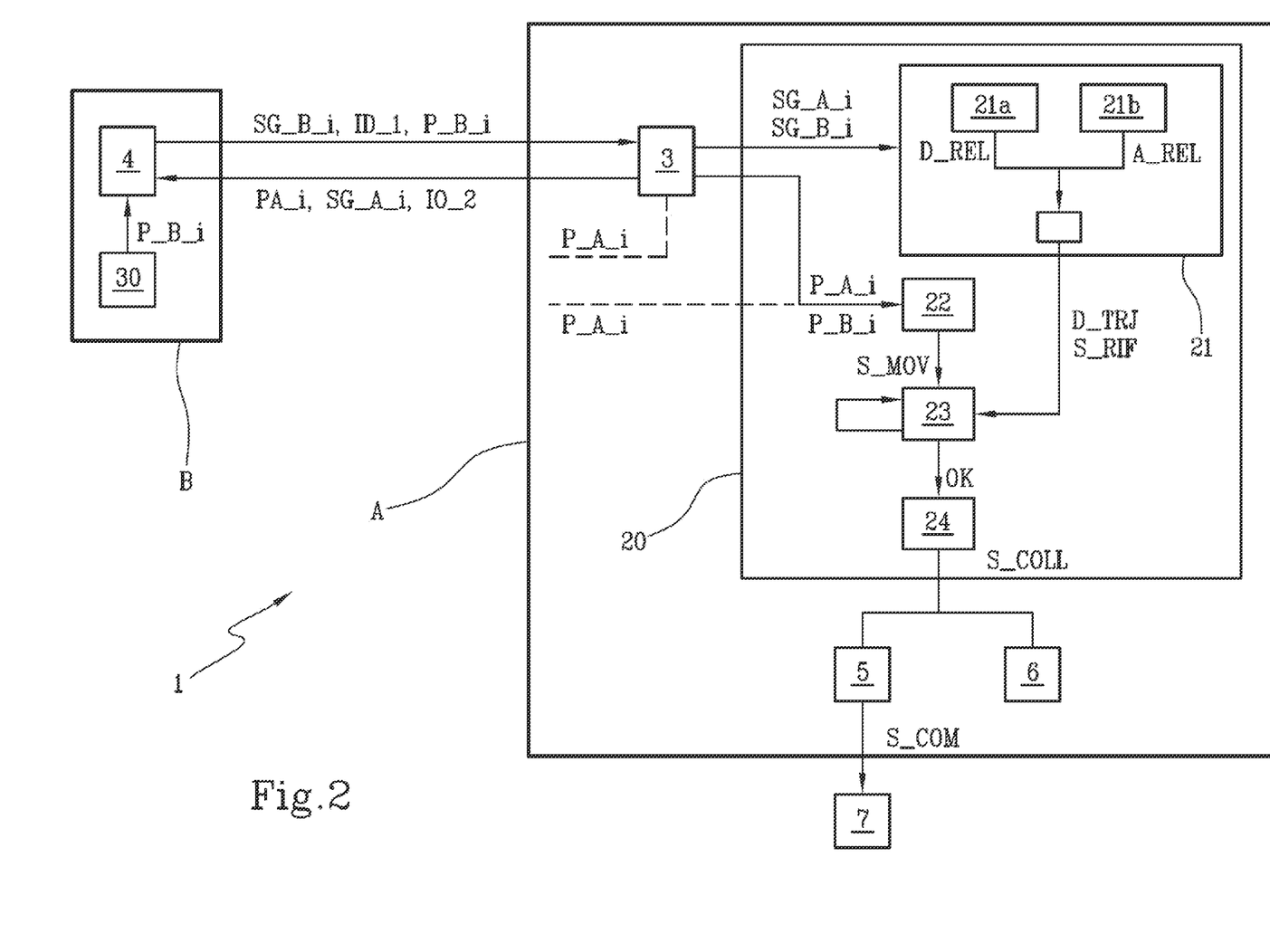
FIG. 2 is a block diagram of the system of FIG. 1.

With reference to the cited figures, the anti-collision system for ground vehicles operating in a work environment according to the invention is indicated overall with the reference number 1 in the block diagram of FIG. 2. One part of the system is mounted on at least one ground vehicle A and another part is associated with a possible obstacle B.

The obstacle B may consist of objects, machinery and/or persons, stationary or moving.

The obstacle B may also be a second ground vehicle, capable of moving with respect to the first vehicle A.

In particular, the ground vehicle may be a forklift or a self-driving ground vehicle. In a first aspect, the present invention relates to an anti-collision system 1 for ground vehicles, comprising a first transceiver device 4, associated with an obstacle B, configured to generate and transmit one or more wireless signals SG_B_i, at predetermined time intervals (i.e., periodically), the first wireless signal SG_B_1 carrying an obstacle identification code ID_1; a second transceiver device 3, associated with a ground vehicle A, configured to generate and transmit one or more wireless signals SG_A_i and to receive said one or more wireless signals SG_B_i, generated by the obstacle B, comprising said first wireless signal SG_B_1 which carries the obstacle identification code ID_1.

The wireless signal SG_A_1 generated by the second transceiver device 3 associated with the ground vehicle A carries an identification code ID_2 of the vehicle A.

The first transceiver device 4 is configured to receive said one or more wireless signals SG_A_i transmitted by the second transceiver device 3 associated with the ground vehicle A.

The anti-collision system 1 for ground vehicles operating in a work environment further comprises a processing unit 20 configured to process collision data of the vehicle A. The processing unit 20 comprises:

a first calculation module 21 configured to determine the trajectory D_TRJ of the ground vehicle A and the obstacle B as a function of said wireless signals SG_B_i and of said one or more signals SG_A_i;

a second calculation module 23 configured to determine, on the basis of the trajectory D_TRJ of the ground vehicle A and of the obstacle B the probability of collision between the ground vehicle A and the obstacle B;

an alerting module 24 configured to generate and send a signal of probability of collision S_COLL between the ground vehicle A and the obstacle B as a function of a high probability of collision between said ground vehicle A and the obstacle B.

In particular, a comparison module (not shown in the figures) is advantageously present, configured to compare the signal of probability of collision S_COLL between the ground vehicle A and the obstacle B, received from the third calculation module 23, with pre-established threshold values stored in a memory unit. In this case, the alerting module 24 is configured to generate and send a signal of probability of collision S_COLL between the ground vehicle A and the obstacle B as a function of a match OK of the comparison made by the comparison module.

In general, it should be noted that in the present context and in the subsequent claims, the processing unit 20 is considered to be split into distinct functional modules (storage modules or operating modules) for the sole purpose of describing its functionalities clearly and completely.

Such processing unit can comprise a single electronic device, appropriately programmed to perform the functionalities described, and the different modules can correspond to hardware entities and/or routine software that are part of the programmed device.

Alternatively or additionally, these functionalities can be performed by a plurality of electronic devices on which the aforesaid functional modules can be distributed.

The processing unit 20 can also make use of one or more processors for executing the instructions contained in the memory modules.

If there are two or more ground vehicles and/or a plurality of obstacles, each will house at least one transceiver device 3,4.

Advantageously, the first calculation module 21 comprises a first calculation sub-module 21a configured to calculate the relative distance D_REL between the ground vehicle A and the obstacle B, on the basis of the exchanged signals SG_B_i, SG_A_i; and a second sub-module 21b configured to calculate the relative angle A_REL between the ground vehicle A and the obstacle B in a given reference system S_RIF on the basis of the signals SG_B_i received from the transceiver device 3.

For example, the reference system S_RIF is a two-dimensional and/or three-dimensional Cartesian coordinate system integral with vehicle A.

In a first localisation operating mode between the ground vehicle A and the obstacle B, only one message, SG_B_1, is used and the processing unit 20 of the ground vehicle A calculates the relative distance D_REL from the obstacle B using the power of the signal received (both UWB and Bluetooth).

The angle from which the ground vehicle A sees the obstacle B (thus the reference system S_RIF is integral with the vehicle A) can be calculated from the vehicle A by means of the Angle of Arrival (AoA) technique, using multiple antennas, upon reception of the messages SG_B_i.

The angle from which the obstacle B sees the vehicle A (therefore the reference system S_RIF is integral with the obstacle B and not with the vehicle as before) can also be calculated by vehicle A with the Bluetooth Angle of Departure (AoD) technique. In this case the obstacle B emits a signal SG_B_1 from several antennas and the vehicle receives with only one antenna. Alternatively, upon receiving the signal SG_B_1, the vehicle A can calculate both the relative distance D_REL and angle A_REL using the difference in arrival times of the signal SG_B_i from three or more type-3 transceivers (TDOA UWB technique, or the difference in the arrival time).

In a second localisation operating mode between the ground vehicle A and the obstacle B only two messages SG_B_1, SG_A_1 are used. With the signal SG_B_1, the obstacle B sends the identification code ID_1 thereof. If it is known, the obstacle B also sends the last calculated position of the obstacle B with respect to the vehicle A. With the signal SG_A_1, the vehicle sends the time T_reply_A (estimated time elapsed between the start of reception of the message SG_B_1 and the start of sending of the signal SG_A_1) to the obstacle B which will be used to calculate the travel time, then the relative distance D_REL between the vehicle A and the obstacle B. For this calculation, the formula TOF=(t2−t1−T_reply_A)/2 can be used.

The angle which the obstacle B forms with respect to the vehicle A is calculated by means of the AoA technique, using multiple antennas, upon the reception of the messages SG_B_i.

In a third localisation operating mode between the ground vehicle A and the obstacle B, three messages SG_B_1, SG_A_1 and SG_B_2 are used.

In detail, by means of the signal SG_B_1, the obstacle sends the identification code ID_1 thereof. By means of the signal SG_A_1 the vehicle A can send the previously calculated position of the obstacle B to the obstacle B.

Subsequently, the obstacle B generates and sends the signal SG_B_2 containing the time T_round_B (time elapsed between the start of sending SG_B_1 and the start of reception of SG_A_1) and T_reply_B (estimated time elapsed between the start of reception of SG_A_1 and the start of sending SG_B_2) which will be used to calculate the travel time. The relative angle A_REL which the obstacle B forms with respect to the vehicle A is calculated by means of the AoA technique, using multiple antennas, upon the reception of the messages SG_B_2. At the end of the exchange of the three messages, the processing unit 20 of the vehicle A performs the calculation of the relative distance D_REL of the obstacle B using the processing times (round trip and reply) of both the obstacle B and the vehicle A, together with the arrival time of the final package. In this case, the accuracy of the calculation of D_REL and the angle A_REL is high.

In the three localisation operating modes the relative distance D_REL between the ground vehicle A and the obstacle B, the angle of the tag of the obstacle B with respect to the ground vehicle A is calculated by exploiting the reception of the last message by two or more antennas.

The anti-collision method for ground vehicles of the present invention comprises steps or phases for identifying and tracing obstacles (associated with tags) or ground vehicles which are closer to a given vehicle and are therefore more likely to collide with the vehicle.

In particular, said steps of identifying and tracing vehicles close to a vehicle are carried out using the UWB technique.

In particular, this method is based on a continuous exchange of messages between the tags and the vehicles closest thereto.

The exchange of messages between a given tag and a vehicle allows to determine the position of the tag with respect to the vehicle as described above.

The tag starts the exchange of messages with a first initial request message (SG_B_1). The message exchange can be of two types:
1. Identification Exchange (IE): where the initial request message contains a unique destination ID and only the vehicle holding that ID can respond;
2. Broadcast Exchange (BE): where the initial request message does not contain a particular destination ID and all vehicles within range can respond.

Figure 4:
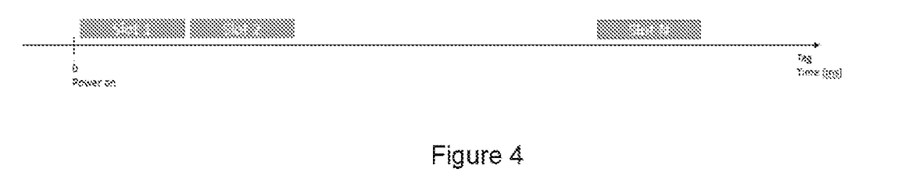
FIG. 4 shows a diagram with the temporal division, in time slots, of a tag.

As illustrated in FIG. 4, each tag is configured to divide the time into time slots numbered "Slot_1", "Slot_2", "Slot_3", . . . , "Slot_N".

In each individual time slot "Slot_i", a tag can perform one or more of the following steps: maintain memory of each vehicle with which it is exchanging messages. In particular at least: the type of exchange carried out, the spatial distance (calculated or estimated) from the tag, and the time offset for the start of the message exchange (relative to the start of the time slot). An example of an implementation to track this information is to store a table in memory, the "vehicle table". This table contains, for each vehicle with which the tag is exchanging messages, at least the fields of: vehicle ID (unique in the table), spatial distance (Euclidean or other) from the tag, type of exchange carried out, time offset. This table can contain N records, is sorted by increasing distance value, and is updated after the envisaged messages are exchanged in each time slot. A vehicle VA is considered closer to the tag of a vehicle VB if VA has a distance value less than VB. And s, with s<=N, closest vehicles of which the tag is aware are the first s vehicles contained in the vehicle table.

manage up to n_ie (greater than or equal to 1) IE message exchanges and up to n_be (greater than or equal to 1) BE message exchanges with (n_ie+n_be) different vehicles;

an exchange of messages can move its execution within a time slot to avoid an RF collision;

a BE message is always executed;

an IE message can only be executed when there is at least one vehicle responding from the preceding time slots;

at the end of the time slot message exchanges, the vehicle table is updated and reordered with the new information acquired as a result of the message exchange, then the targets IDs for any subsequent IE messages are calculated;

the next IE messages will be addressed to the first n_ie vehicles appearing in the vehicle table;

if there is no response to a BE message, then the tag can decide whether to execute the next BE message with a new offset time (relative to the start of the time slot). In addition, if this BE has been answered in the preceding time slot from the vehicle Az, the tag can decide to remove Az from the vehicle table;

if there is no response to an IE message from the vehicle Ay for a given number J of consecutive times, then: a) if there is no response from any BE message, only one BE message will be executed in the subsequent time slot. In addition, the vehicle Ay is removed from the vehicle table;

b) if one or more BE messages have been answered, the vehicle Ay shall be removed from the vehicle table.

At the time slot end, after updating and reordering the vehicle table, it will be chosen for this IE whether to direct, in the next time slot, the first vehicle Ax in the table which had a BE-type exchange.

an exchange of messages which has been answered by a vehicle, will maintain its current offset (relative to the start of the time slot) also in the subsequent time slot.

In each individual time slot "Slot_i", a vehicle A may perform one or more of the following steps:

keep memory of the current slot number of each tag with which it communicates.

The time slot number of the tag can be sent by the tag itself or the vehicle can estimate it knowing the duration of a time slot and the arrival times of the messages from the tags;

has only one message exchange with a predetermined tag;

may respond immediately to a Broadcast Exchange or wait a random time between 0 and a time t_Wait.

The random time may be preconfigured or dynamically adjusted.

may not respond to a tag if the received power of the first message, SG_B_1, is less than a predetermined threshold;

may respond, at each time slot or at each n1 (n1=1, 2, 3, . . . ) time slots, to a Broadcast Exchange from the same tag. This may be preconfigured or dynamically adjusted.

The method is efficient both from an energy point of view and for the occupation of the UWB channel. This is because a tag does not communicate with all the vehicles present but only tries to communicate with the nearest vehicles spatially, therefore with the vehicles that are most relevant in order to detect a possible collision.

In addition, the method does not require tags to know a priori which possible vehicles (i.e., the identifiers thereof) it may come into contact with.

This means the tags do not have to be reconfigured each time.

Finally, the method ensures that an obstacle (tag) is detected by the n_ie+n_be*n1 closest vehicles.

The exchanges of IE messages from a tag to the same vehicle will be exchanged with a 1/T_slot frequency (where T_slot is the duration in seconds of the time slot, typically T_slot=0.1 s). The exchanges of BE messages from a tag to the same vehicle will be exchanged with frequency 1/(n_1*T_slot).

In practice, a good choice is n_ie=n_be=1 and n1=2.

Figure 5A:
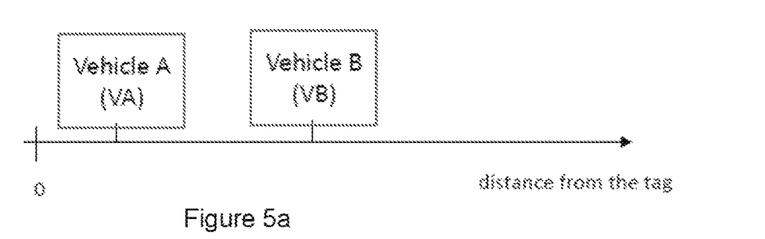
FIGS. 5a, 5b, 5c show an example of a method for identifying and tracing ground vehicles closest to a given tag.
Figure 5B:
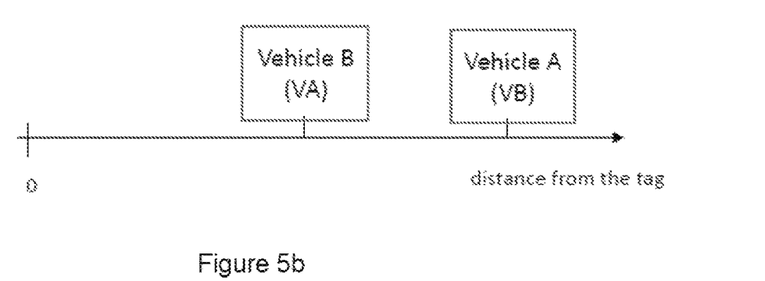
Figure 5C:
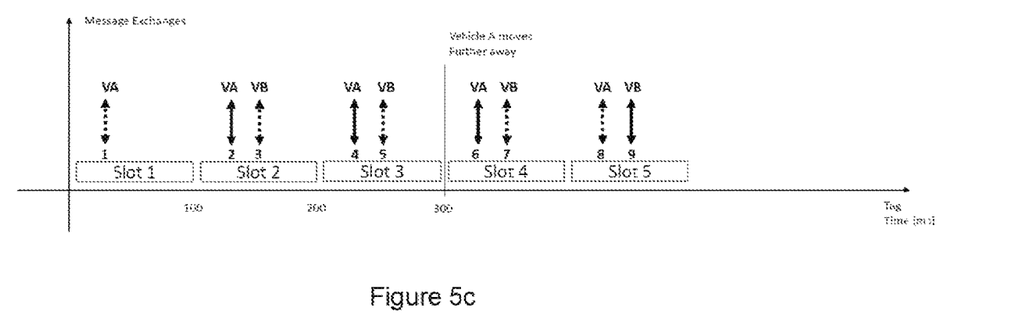

FIGS. 5a, 5b and 5c illustrate an execution example of the method according to the present invention. In FIG. 5c it is assumed that the parameters n1, n_ie and n_be are all 1.

FIG. 5a shows the distance of the first VA and the second vehicle VB from the tag.

FIG. 5b instead shows the distance of the two vehicles VA and VB from the tag from the 300 ms instant of FIG. 5c.

The figures show two vehicles (VA and VB) in the vicinity of a given tag.

Up to the time 300 ms, the first vehicle VA is closer to the tag than the second vehicle VB (FIG. 5a).

At the time 300 ms, the first vehicle VA moves away, and the second vehicle VB approaches the closest tag of the first vehicle VA (FIG. 5b).

In the first time slot (Slot_1), the tag only performs a message exchange in BE mode. Since the first vehicle VA responds by sending the ID thereof to the tag, in the time slot_2 the tag performs an IE with the first vehicle VA and another BE to search for the presence of another vehicle.

Since the second vehicle VB also responds to the BE, the relative offset of both messages will be maintained.

In the time slot_3 the sequence of message exchanges repeats exactly because the first vehicle VA is closer to the tag with respect to the second vehicle VB.

Also in the time slot_4, the message exchange sequence repeats in the same way as the time slot_2 and time slot_3.

At the end of the time slot_4, the tag realises that the second vehicle VB is now the closest, while the first vehicle VA has moved away.

In the subsequent time slot_5, the system will perform an IE with the second vehicle VB.

Figure 6:
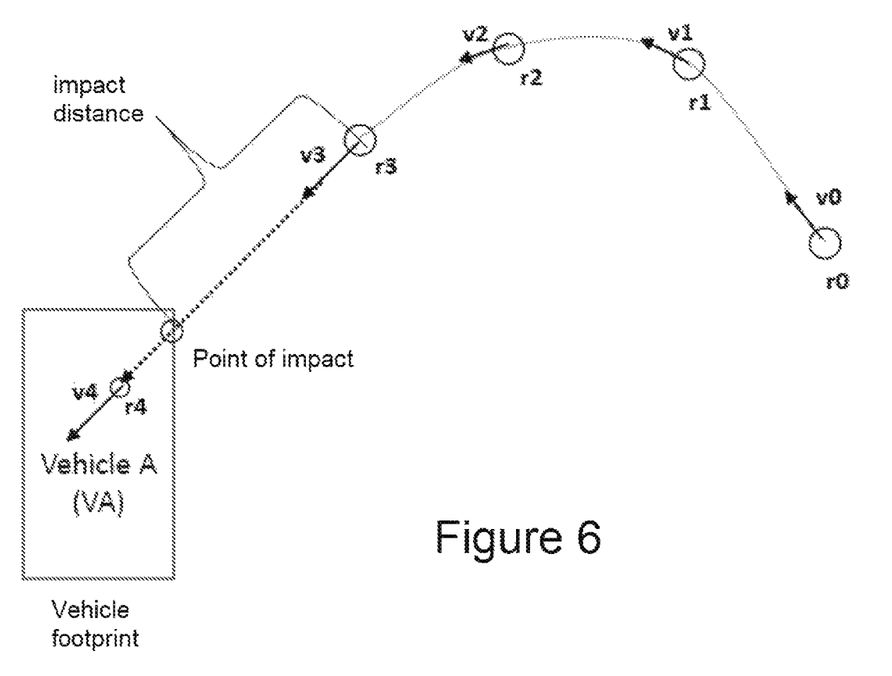
FIG. 6 schematically shows an example calculation of probability of collision through the computing of trajectories.

FIG. 6 shows an example calculation of probability of collision through the computing of the trajectories. In this figure, ri indicates the position of the obstacle (tag) in the time slot_i and vi indicates the speed of the obstacle in the time slot_i.

In FIG. 6 the current time slot is number 3 (slot_3).

The historical trajectory is the set r0, v0, r1, v1, r2, v2, r3, v3.

The predictive trajectory is the set r3, v3, r_impatto, v_impatto, r4, v4.

Time before impact=impact distance/|v3|, where |v3| indicates the intensity of the vector v3.

A vehicle maintains the historical trajectory of an obstacle which is given by the set of position and velocity relative to the vehicle for each time slot up to the current time slot.

From the historical trajectory of an obstacle, the vehicle calculates a predictive trajectory for the next N time slots. From the predictive trajectory and geometric information of the vehicle (footprint), the possible point of impact of the vehicle with the obstacle is calculated with the relative time before impact.

Finally, the probability of collision is defined by assigning an impact probability value to each value of the magnitude "time before impact". For example, we could say that when "time before impact" is less than 2 seconds, then the probability of collision is equal to one.

If "time before impact" is greater than 2 seconds and less than 4 seconds, then the probability of collision is 0.8 and so on.

The predictive trajectory can be calculated, for example, by assuming that the vehicle continues to move from its current position at the last calculated speed.

The method described is efficient both from an energy point of view and for the occupation of the UWB channel.

This is because in each time slot, a tag carries out at most (n_ie+n_be) message exchanges to detect the collision with possible obstacles. This is made possible because a tag only tries to communicate with the closest obstacles spatially.

In addition, the method does not require tags to know a priori which possible vehicles (i.e., the identifiers thereof) it may come into contact with. This means the tags do not have to be reconfigured each time.

The signals SG_1, SG_2 generated and transmitted by each of the transceiver devices 3, 4 present in the system 1 are advantageously ultra-wideband (UWB) type signals.

The ultra-wideband type signal is defined as a radio frequency (RF) signal which occupies a portion of the frequency spectrum greater than 20% of the central carrier or has a bandwidth greater than 500 MHz. The UWB is a communication channel which spreads over a large portion of the frequency spectrum. This allows UWB transmitters to transmit large amounts of data while consuming little transmission energy. UWB can be used to determine positioning by using the time difference of arrival ("TDOA") of the RF signals to obtain the distance between the reference point and the obstacle or using a precise measurement of the distance using the two-way ranging technique ("TWR").

Alternatively, the signals transmitted by the transceiver devices 3 and 4 are Bluetooth signals.

In order to alleviate the occupancy of the UWB band and consequently reduce the likelihood of a collision in the channel, especially in situations where many tags are present in the vicinity of vehicles, additional transceivers may be introduced on tags and vehicles operating in a different RF band (e.g., BLE or RFID).

We refer to this band as a supporting RF channel.

Furthermore, these transceivers are connected to the UWB units so that information can be conveyed (e.g., ignition signal).

In general, tags through an exchange of messages in the support channel try to detect the presence of vehicles in the immediate vicinity.

If a vehicle is detected, a less accurate estimate of its distance is calculated. This estimate is generally calculated using the received signal strength. If this estimate is less than a specified threshold, then the tag activates the UWB system operation for more accurate localisation and suspends the supporting transceiver.

When the tag detects that there are no vehicles closer than a specified threshold, it will suspend the UWB system and activate the supporting transceiver.

Below are two possible options for starting the exchange of support messages between tags and vehicle:
1) the vehicles are always listening to messages in the supporting band and respond to any messages sent by the tags.

A tag periodically exchanges messages in the supporting channel. BLE technology would preferably be used for this option.
2) the vehicles periodically send a message in the supporting channel which can be received by the tags through a continuous or periodic listening of the supporting channel. RFID technology would preferably be used for this option.

In the situation where a collision danger probability is detected, the alerting module 24 sends the signal of probability of collision S_COLL to a control module 5 of the ground vehicle A. In particular, a collision danger probability occurs if the probability of collision S_COLL exceeds a threshold value that can be pre-established and stored in a memory unit present in the system 1, above which the alerting module 24 sends the signal of probability of collision S_COLL to the control module 5.

In this case, the control module 5 of the vehicle A is configured to in turn send a suitable command signal S_COM to the controller 7 of the vehicle A so that the controller 7 is able to intervene on the vehicle A in the event of a risk of collision.

Possible examples of vehicle intervention modes comprise emergency actuation of the vehicle braking system, slowing of the vehicle, actuation of the vehicle steering members, in order to avoid the possible impact with the obstacle B.

In this way, via the control module 5, the processing unit 20 is able to act on the braking system and/or the engine system and/or the direction of the vehicle A as a function of the signal of probability of collision S_COLL received from the alerting module 24.

The alerting module 24 is also configured to send the signal of probability of collision S_COLL to an alerting device 6 configured to alert the driver of the vehicle A and/or the persons who are in the vicinity of the vehicle A to a situation of potential danger.

Some non-limiting examples of possible control signals S_COM comprise one or more actions among, at least, a vehicle slowdown, a vehicle braking, a return to normal operation of the vehicle B, a change of direction of the vehicle A relative to the collision direction of the obstacle B in collision motion.

Some non-limiting examples of possible alerting devices 6 comprise one or more among, at least, one user interface, an audible warning device, and/or an optical warning device.

Advantageously, the transceiver 3 present on the ground vehicle A uses the Angle of Arrival and/or Angle of Departure and/or time difference of arrival (TDOA) method to determine the relative position between the two transceivers 3 and 4.

Advantageously, the first transceiver device 4 associated with the obstacle B is configured to send at least one characteristic parameter P_B_i of the movement of the obstacle B. In this case, the processing unit 20 comprises a calculation module 22 configured to calculate the movement of the obstacle B as a function of said characteristic parameter P_B_i. Alternatively, the module for calculating the movement S_MOV of the obstacle B (direction, speed, acceleration) may be present on the obstacle B (not shown in the figures).

The optional characteristic parameter P_B_i, P_A_i sent by the transmitter 3 or 4 of the possible movement of the obstacle B comprises one or more among, at least, an acceleration signal S_ACC, an angular velocity signal S_GYR (i.e., the angle spaced in the unit of time on the various axes), a signal relative to the angle with respect to the magnetic north S_MAGN, an atmospheric pressure signal S_-BAR, a signal relative to the type of obstacle (e.g., a person, a stationary object, a moving object or the like) and/or a temperature signal S_TEMP and/or a time signal (e.g., the number of time slots or the time since the transmitter 3 associated with the obstacle was switched on).

Advantageously, the transceiver 4 associated with the obstacle B is operatively associated with an IMU (inertial Measurement Unit) 30 comprising one or more among, at least, an accelerometer, a gyroscope, a magnetometer, a barometer and/or a thermometer.

Advantageously, the second transceiver device 4 associated with the obstacle B is configured to receive the relative distance D_REL from the first transceiver device 3 associated with the vehicle A.

In this way, for example, also the obstacle B, in the case of a moving ground vehicle and with the possibility of avoiding the collision with the ground vehicle A, will also be able to assess the probability of collision with the vehicle A and avoid a probable collision.

Advantageously, the second transceiver device 3 associated with the ground vehicle A may be configured to receive at least one characteristic parameter P_A_i of the movement of the vehicle A (detected by appropriate sensors present on the ground vehicle or specially installed on the vehicle) such as velocity, acceleration, steering angle, etc.

The second transceiver device 3 may be further configured to send said at least one characteristic parameter P_A_i, detected by the sensors of the vehicle A, to the module 22 or to the transceiver 4 of the obstacle B (in case the obstacle B is moving).

The characteristic parameter P_A_i, detected by the sensors can also be sent directly to the calculation module 22.

In the situation where the characteristic parameter P_A_i and/or P_B_i is available, the second calculation module 23 of the processing unit 20 will more accurately calculate the probability of collision (or impact trajectory).

The processing unit 20 optionally comprises a filtering module configured to filter the signals SG_1, SG_2, P_A_i, P_B_i or the magnitudes derived therefrom (e.g. angle, distance, etc.) from one or more transceivers 3, 4.

Examples of filtering are medium filter, exponential flattening or Bayesian filters.

Advantageously, the processing unit 20 comprises a danger tracking and detection module configured to track the location, velocity, orientation and acceleration of external UWB tags and the host ground vehicle. On the basis of the current positions of the external UWB tags, the prediction of the future positions thereof and the movement of the vehicle, it is possible to predict dangerous situations and potential collisions.

Optionally, each ground vehicle A and each obstacle B contains a memory module containing a unique identification code ID_A, ID_B of said vehicle A and of said obstacle B. In this way it is possible to know and trace the identity of each obstacle and each ground vehicle present in the system 1.

Optionally, the alerting module 24 is also configured to activate and/or stop alerting a potential danger.

In particular, the ground vehicle A may, by way of non-limiting example, be a forklift.

In addition, the obstacle B may be a fixed obstacle or a moving obstacle.

If the obstacle B is moving, it may be, by way of non-limiting example, another ground vehicle or a person wearing the second transceiver device 4.

Figure 3:
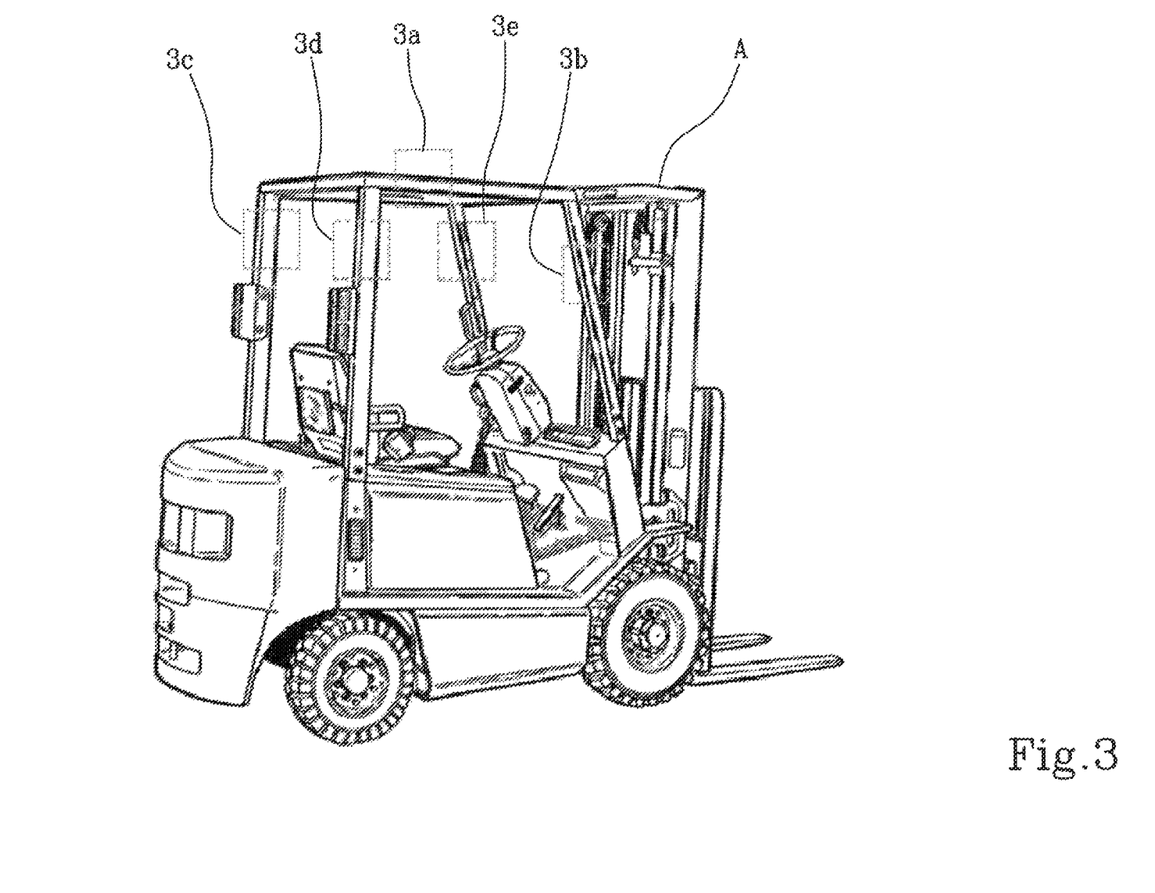
FIG. 3 shows a non-limiting example of a ground vehicle.

In a non-limiting example of the invention, as illustrated in FIG. 3, the transceiver 3 housed on the ground vehicle A comprises a UWB tag 3a and a plurality of AoA nodes 3b, 3c, 3d, 3e.

Preferably, the UWB tag 3a may be installed on the roof of the ground vehicle A and each of the AoA nodes 3b, 3c, 3d, 3e may be installed, respectively, on the front, rear and two sides of the vehicle A. In this way, a complete directionality of the signals transmitted and received by the transceiver devices is obtained, improving the overall efficiency of the system 1.

In particular, an AoA UWB node 3b, 3c, 3d, 3e is a transceiver device capable of communicating with a UWB tag (installed on an obstacle B or on a second vehicle and/or operator) using ultra-wideband (UWB) technology. A UWB AoA node 3b, 3c, 3d, 3e uses the angle of arrival (AoA) method to determine the relative position of a UWB tag 3a relative to the UWB AoA node 3b, 3c, 3d, 3e.

A UWB tag 3a is a transceiver device capable of communicating with a UWB AoA node 3b, 3c, 3d, 3e using ultra-wideband (UWB) technology.

An AoA UWB tag 3a may include an extended IMU 30. The extended IMU 30 contains at least one of the following elements: an accelerometer, a gyroscope, a magnetometer, a barometer, a thermometer.

A UWB tag 3a may communicate the data of the extended IMU 30 thereof to the UWB AoA node 3b, 3c, 3d, 3e and may receive the relative position thereof from the UWB AoA node 3b, 3c, 3d, 3e.

During operation, each of the AoA UWB nodes 3b, 3c, 3d, 3e and the UWB tag 3a on the vehicle A continuously detect the proximity of any obstacle B (e.g., a person at work, another vehicle, or a structure) located in the vicinity of the forklift transceiver apparatus.

In this regard, the proximity of an obstacle B to the forklift A will typically include not only the relative distance of the obstacle B from the ground vehicle A, but also the direction relative to the vehicle A.

The detection system may then typically include a plurality of sensors oriented or directed in known directions and whose collective signals may determine the position relative to the forklift or obstacle apparatus on a two-dimensional and/or three-dimensional Cartesian grid.

In a second aspect of the invention, an anti-collision method for ground vehicles operating in a work environment is provided comprising the steps of:

a) associating a first transceiver device 4 with an obstacle B, said first transceiver device 4 being configured to generate and transmit one or more wireless signals SG_B_i, the first wireless signal SG_B_1 carrying an obstacle identification code ID_1;

b) associating a second transceiver device 3 with a ground vehicle A, said second transceiver device 3 being configured to generate and transmit one or more wireless signals SG_A_i;

c) transmitting from said obstacle B at pre-established time intervals, said one or more wireless signals SG_B_i;

d) receiving, from said second transceiver device 4 associated with the ground vehicle A, said first signal SG_B_1 with the obstacle identification code ID_1 transmitted by the first transceiver device 3 associated with the obstacle B;

e) determining the trajectory D_TRJ of the ground vehicle A and the obstacle B as a function of the signals SG_B_i; SG_A_i;

f) determining the probability of collision between said ground vehicle A and the obstacle B as a function of the trajectory D_TRJ of the ground vehicle A and the obstacle B;

g) generating a signal of probability of collision S_COLL between the ground vehicle A and the obstacle B as a function of a high probability of collision between said ground vehicle A and the obstacle B.

h) sending said signal of probability of collision S_COLL.

Preferably, the trajectory of the ground vehicle A and the obstacle B determined in step e) are calculated with the sub-steps of:

e1) calculating the relative distance D_REL between the ground vehicle A and the obstacle (B), on the basis of the wireless signals SG_B_i; SG_A_i exchanged between the first transceiver device 4 and the second transceiver device 4 associated with the obstacle B;

e2) calculating the relative angle A_REL between the ground vehicle A and the obstacle B in a given reference system S_RIF.

Advantageously, the signals SG_1; SG_2 transmitted by the transceiver devices 3; 4 are ultra-wideband signals.

Alternatively, the first and the second signal SG_A_i; SG_B_i transmitted by said first and second transceiver devices 3 and 4 are Bluetooth signals and the trajectory determined in step e) is calculated with the angle of departure method or with the angle of arrival method.

The present invention achieves the following technical effects:

accurate calculation of the position of the vehicles with respect to a tag, using the AoA technique and measuring the distance (without which the position cannot be accurately calculated) for the precise relative localisation;

use of this precise relative localisation (precision is an important enabler) to discriminate:

between situations in which a potential collision would be possible and that in which, for a "generic" system, it would be possible and instead with the system object of the application, it is known that the collision will not occur (for example, the passage/intersection between two machines side by side);
the calculation of trajectories.

As a person skilled in the art can easily understand, the invention allows overcoming the drawbacks highlighted above with reference to the prior art.

In particular, the present invention allows improving the safety of the operators and means operating in a work environment or in an open environment at risk of potential collisions. It also allows better safety management in environments where ground vehicles operate.

It is clear that the specific characteristics are described in relation to different embodiments of the invention with an exemplary and non-limiting intent. Obviously a person skilled in the art can make further modifications and variants to the present invention, in order to satisfy contingent and specific needs. For example, the technical characteristics described in relation to an embodiment of the invention can be extrapolated therefrom and applied to other embodiments of the invention. Such modifications and variations are moreover embraced within the scope of the invention as defined by the following claims.

The invention claimed is:

1. An anti-collision system for ground vehicles, comprising:
a first transceiver device, associated with an obstacle, configured to generate and transmit one or more wireless signals at pre-established time intervals, the first wireless signal carrying an obstacle identification code;
a second transceiver device, associated with a ground vehicle, configured to transmit one or more wireless signals and to receive said first wireless signal which carries the obstacle identification code;
said first transceiver device being configured to receive said signals transmitted by the second transceiver device associated with the ground vehicle;
a processing unit installed in the ground vehicle and configured to process collision data, comprising:
a first calculation module configured to determine the trajectory of the ground vehicle and of the obstacle as a function of said wireless signals and said wireless signals;
a second calculation module configured to determine, on the basis of said trajectory, the probability of collision between the ground vehicle and the obstacle;
an alerting module configured to generate and send a signal of probability of collision between the ground vehicle and the obstacle as a function of a high probability of collision between said ground vehicle and the obstacle,
wherein the processing unit calculates a relative distance from the ground vehicle to the obstacle based on signal power of a signal received from the obstacle;
a tag associated with the obstacle, wherein the tag is configured to engage in different types of information exchange with different vehicles: the first type is based on an initial request message containing a unique destination ID, wherein only a vehicle holding that ID can respond; and the second type is based on an initial request message directed to vehicles within a pre-defined range, wherein any vehicle within that range can respond.

2. The system according to claim 1, wherein the first calculation module comprises:
a first calculation sub-module configured to calculate the relative distance between the ground vehicle and the obstacle, on the basis of the signal transmitted by the second transceiver device associated with the obstacle; and
a second sub-module configured to calculate the relative angle between the ground vehicle and the obstacle in a given reference system.

3. The system according to claim 2, wherein the signals transmitted by said transceiver devices are ultra-wideband signals.

4. The system according to claim 2, wherein the first calculation sub-module is configured to calculate the relative distance between the ground vehicle and the obstacle on the basis of the power of the transmitted signal and wherein the second sub-module is configured to calculate the relative angle between the ground vehicle and the obstacle in a given reference system using the angle of arrival or angle of departure technique on the received signal.

5. The system according to claim 2, wherein the ground vehicle comprises a plurality of second transceiver devices, the first calculation sub-module is configured to calculate the relative distance between the ground vehicle and the obstacle on the basis of the difference in the time of arrival of the signal received from the plurality of second transceiver devices, and wherein the second sub-module is configured to calculate the relative angle between the ground vehicle and the obstacle in a given reference system using the time difference of arrival technique.

6. The system according to claim 5, wherein the control module of the vehicle is configured to send a command signal to the controller of the vehicle so that the controller is capable of acting upon the vehicle in the event of a risk of collision.

7. The system according to claim 5, wherein the alerting device comprises one or more among, at least:
a user interface;
an audible warning device;
an optical warning device.

8. The system according to claim 1, wherein the obstacle comprises a module configured to calculate the relative distance between the ground vehicle and the obstacle on the basis of a periodic and ordered exchange of two messages.

9. The system according to claim 8, wherein the obstacle is configured to send the last calculated relative distance in every message.

10. The system according to claim 1, wherein the signals transmitted by said transceiver devices are Bluetooth signals.

11. The system according to claim 1, wherein the alerting module sends said signal of probability of collision to a control module of the ground vehicle and/or to an alerting device configured to alert the driver of the vehicle and/or the persons who are in the vicinity of the vehicle of a situation of potential danger.

12. The system according to claim 1, wherein said first transceiver device associated with the obstacle is configured to send at least one characteristic parameter of the movement of the obstacle and the processing unit comprises a calculation module configured to calculate the movement of the obstacle as a function of said characteristic parameter.

13. The system according to claim 12, wherein the characteristic parameter of the possible movement of the obstacle comprises one or more among, at least:
type of obstacle;
an acceleration signal;
an angular velocity signal;

a signal relative to the angle with respect to the magnetic north;
an atmospheric pressure signal;
a temperature signal.

14. The system according to claim 1, wherein the transceiver associated with the obstacle is operatively associated with an Inertial Measurement Unit comprising one or more among, at least:
accelerometer;
gyroscope;
magnetometer;
barometer;
thermometer.

15. The system according to claim 1, wherein the processing unit comprises a filtering module configured to filter the signals (coming from one or more transceivers.

16. The system according to claim 1, wherein the obstacle generates and sends a signal containing an elapsed time from transmission of the obstacle identification to the ground vehicle and reception of a calculated position of the obstacle.

17. The system according to claim 1, wherein the tag is configured to divide a time frame into a plurality of time slots, wherein the tag performs the following steps in each time slot: create, maintain or update a record in memory for each vehicle with which it exchanges messages, including the type of information exchange carried out, the spatial distance from the tag to the vehicle, and the time offset between the start of the time slot and the start of message exchange with the vehicle.

18. The system according to claim 17, wherein the record in memory is a table comprising a record of each vehicle with which the tag exchanges information, wherein each vehicle has associated fields containing vehicle ID, type of information exchange, the spatial distance from the tag to the vehicle, and the time offset between the start of the time slot and the start of message exchange with the vehicle, respectively.

19. The system according to claim 18, wherein the vehicle records are sorted according to distance between the tag and the vehicle, and are updated after messages are exchanged in each time slot.

20. An anti-collision method for ground vehicles operating in a work environment, comprising the steps of:
a) associating a first transceiver device with an obstacle, said first transceiver device being configured to generate and transmit one or more wireless signals, the first wireless signal carrying an obstacle identification code;
b) associating a second transceiver device with a ground vehicle, said second transceiver device being configured to generate and transmit one or more wireless signals;
c) transmitting said one or more wireless signals from said obstacle at pre-established time intervals;
d) the second transceiver device receiving said first signal which includes the obstacle identification code;
e) determining the trajectory of the ground vehicle and of the obstacle as a function of the signals;
f) determining the probability of collision between said ground vehicle and the obstacle as a function of the trajectory of the ground vehicle and of the obstacle;
g) generating and sending a signal that includes a probability of collision between the ground vehicle and the obstacle;
h) calculating a relative distance from the ground vehicle to the obstacle based on signal power of a signal received from the obstacle;
i) engaging in different types of information exchange with different vehicles, the first type is based on an initial request message containing a unique destination ID, wherein only a vehicle holding that ID can respond; and the second type is based on an initial request message directed to vehicles within a predefined range, wherein any vehicle within that range can respond.

21. The method according to claim 20, wherein the trajectory of the ground vehicle and of the obstacle determined in step e) is calculated with the sub-steps of:
e1) calculating the relative distance between the ground vehicle and the obstacle, on the basis of wireless signals exchanged between the first transceiver device (4) and the second transceiver device associated with the obstacle;
e2) calculating the relative angle between the ground vehicle and the obstacle in a given reference system.

22. The method according to claim 21, wherein the signals transmitted by said transceiver devices are ultra-wideband signals.

23. The method according to claim 20, wherein one or more steps are implemented by means of a computer.